US 9,661,048 B2

(12) United States Patent
Kent et al.

(10) Patent No.: US 9,661,048 B2
(45) Date of Patent: May 23, 2017

(54) ASSET STREAMING AND DELIVERY

(71) Applicant: Numecent Holdings, Inc., Irvine, CA (US)

(72) Inventors: Osman Kent, Chertsey (GB); Arthur S. Hitomi, Huntington Beach, CA (US)

(73) Assignee: Numecent Holding, Inc., Irvine, CA (US)

( * ) Notice: Subject to any disclaimer, the term of this patent is extended or adjusted under 35 U.S.C. 154(b) by 299 days.

(21) Appl. No.: 14/160,469

(22) Filed: Jan. 21, 2014

(65) Prior Publication Data
US 2014/0207963 A1 Jul. 24, 2014

Related U.S. Application Data

(60) Provisional application No. 61/754,459, filed on Jan. 18, 2013.

(51) Int. Cl.
*G06F 15/16* (2006.01)
*H04L 29/06* (2006.01)
*H04L 29/08* (2006.01)

(52) U.S. Cl.
CPC .......... *H04L 65/60* (2013.01); *H04L 65/4084* (2013.01); *H04L 67/06* (2013.01)

(58) Field of Classification Search
CPC ........ G06F 15/16; H04L 65/60; H04L 65/601
USPC .................................... 709/224, 231; 705/35
See application file for complete search history.

(56) References Cited

U.S. PATENT DOCUMENTS

| 5,860,012 | A  | 1/1999  | Luu            |
| 6,324,690 | B1 | 11/2001 | Luu            |
| 6,343,313 | B1 | 1/2002  | Salesky et al. |
| 6,886,169 | B2 | 4/2005  | Wei            |
| 6,917,963 | B1 | 7/2005  | Hipp et al.    |
| 6,944,858 | B2 | 9/2005  | Luu            |
| 7,210,147 | B1 | 4/2007  | Hipp et al.    |
| 7,240,162 | B2 | 7/2007  | de Vries       |
| 7,522,664 | B1 | 4/2009  | Bhaskar et al. |
| 7,577,751 | B2 | 8/2009  | Vinson et al.  |
| 7,720,864 | B1 | 5/2010  | Muth et al.    |
| 7,958,200 | B2 | 6/2011  | McFadden et al.|
| 8,117,600 | B1 | 2/2012  | Roeck et al.   |
| 8,645,946 | B2 | 2/2014  | Wookey         |

(Continued)

OTHER PUBLICATIONS

Ahlund, "An Approach Toward User-Centric Application Mobility," Master's Thesis in Computing Science, Uema University, Umea, Sweden, Aug. 28, 2009 [retrieved online at http://www8.cs.umu.se/education/examina/Rapporter/AndreasAhlund.pdf on Apr. 22, 2013].

(Continued)

*Primary Examiner* — Tesfay Yohannes
(74) *Attorney, Agent, or Firm* — Sheppard, Mullin, Richter & Hampton LLP

(57) ABSTRACT

Asset streaming and delivery including intercepting, at an asset streaming client, a request to exploit an asset virtualized on the asset streaming client. The asset is identified and an asset snapshot of the asset is obtained. Portions of the asset needed to exploit the asset according to the intercepted request exploit the asset are determined from an asset snapshot of the asset. The portions of the asset needed to exploit the asset according to the intercepted request are obtained and the asset is exploited according to the intercepted request using the portions of the asset.

13 Claims, 8 Drawing Sheets

(56) References Cited

U.S. PATENT DOCUMENTS

| | | | |
|---|---|---|---|
| 8,667,482 B2 | 3/2014 | Bernardi | |
| 8,712,959 B1* | 4/2014 | Lim | G06F 11/1415 707/633 |
| 8,768,800 B2* | 7/2014 | Milosavljevic | G06Q 40/00 705/35 |
| 2001/0034736 A1 | 10/2001 | Eylon et al. | |
| 2003/0004882 A1 | 1/2003 | Holler et al. | |
| 2003/0140089 A1 | 7/2003 | Hines et al. | |
| 2003/0226138 A1 | 12/2003 | Luu | |
| 2004/0024845 A1 | 2/2004 | Fishhaut et al. | |
| 2005/0198647 A1 | 9/2005 | Hipp et al. | |
| 2006/0083308 A1 | 4/2006 | Schwarz et al. | |
| 2006/0122937 A1* | 6/2006 | Gatto | G06F 21/121 705/51 |
| 2007/0083645 A1 | 4/2007 | Roeck et al. | |
| 2007/0254742 A1* | 11/2007 | O'Brien | G07F 17/32 463/42 |
| 2008/0005349 A1* | 1/2008 | Li | H04L 65/4076 709/231 |
| 2008/0120129 A1* | 5/2008 | Seubert | G06Q 10/06 705/35 |
| 2008/0163202 A1 | 7/2008 | Kembel et al. | |
| 2008/0165280 A1 | 7/2008 | Deever et al. | |
| 2008/0222659 A1 | 9/2008 | Brumme | |
| 2008/0228865 A1 | 9/2008 | Cruzada | |
| 2008/0301280 A1* | 12/2008 | Chasen | H04L 67/02 709/224 |
| 2009/0109213 A1 | 4/2009 | Hamilton, II | |
| 2009/0158311 A1* | 6/2009 | Hon | H04H 60/31 725/14 |
| 2009/0203368 A1 | 8/2009 | Marsyla et al. | |
| 2009/0204711 A1 | 8/2009 | Binyamin et al. | |
| 2010/0070526 A1 | 3/2010 | Matias | |
| 2010/0138475 A1 | 6/2010 | Frank et al. | |
| 2010/0235112 A1* | 9/2010 | Kesler | G06Q 10/04 702/35 |
| 2010/0235153 A1* | 9/2010 | Sharp | G06Q 10/04 703/6 |
| 2010/0250670 A1 | 9/2010 | Wei | |
| 2010/0333085 A1 | 12/2010 | Criddle et al. | |
| 2011/0063500 A1 | 3/2011 | Loher et al. | |
| 2011/0066570 A1* | 3/2011 | Kolo | G06Q 40/06 705/36 R |
| 2012/0066286 A1 | 3/2012 | Heredia et al. | |
| 2012/0110131 A1 | 5/2012 | Villagas Nunez et al. | |
| 2012/0144386 A1 | 6/2012 | Wookey | |
| 2012/0278439 A1 | 11/2012 | Ahiska | |
| 2012/0297311 A1 | 11/2012 | Duggal | |
| 2013/0007227 A1 | 1/2013 | Hitomi et al. | |
| 2013/0045759 A1* | 2/2013 | Smith | H04W 64/00 455/456.6 |
| 2013/0073775 A1 | 3/2013 | Wade et al. | |
| 2014/0068022 A1 | 3/2014 | Kshirsagar et al. | |
| 2014/0136601 A1 | 5/2014 | Kent et al. | |
| 2014/0169471 A1 | 6/2014 | He | |

OTHER PUBLICATIONS

International Application No. PCT/US2013/022295, International Search Report and Written Opinion mailed Apr. 15, 2013.

International Application No. PCT/US2013/059316, International Search Report and Written Opinion mailed Mar. 20, 2014.

* cited by examiner

ASSET STREAMING AND DELIVERY

CROSS-REFERENCE TO RELATED APPLICATIONS

This application claims priority to U.S. Provisional Patent Application No. 61/754,459 entitled ASSET STREAMING AND DELIVERY SYSTEM FOR CONNECTED DEVICES, filed Jan. 18, 2013, which is incorporated herein by reference.

BACKGROUND

An area of ongoing research and development is application delivery to computing devices. One aspect of application delivery is speed. Current application delivery platforms enable a device to download an application, which takes as much time as is required to accomplish the download, followed by an installation time. When the application is delivered from a relatively remote source, additional issues arise.

Another aspect of application delivery is security. Not all application delivery platforms offer the same amount of security in application delivery, piracy prevention, or the like. Other aspects of application delivery include network utilization, reduced power requirements for devices to which applications are delivered (and potentially for devices from which applications are delivered), and application and operating system performance consistency.

Downloading and installing an application is a simple way to obtain performance consistency, but this technique has other shortcomings. For example, there is often no effective piracy prevention in the delivery mechanism (though there can be piracy prevention through other techniques). This technique also means the device onto which the application is delivered must be capable of storing the application and running the application with sufficient speed such that users are not bothered by the performance. Network utilization is also limited to controlling the download, which essentially only impacts download times for a device without necessarily enabling load balancing to improve performance of all devices. These weaknesses with standard download/install have led to continuing research into virtual application delivery solutions.

Another area of ongoing research and development is asset delivery to computing devices, particularly devices largely designed to provide functionality based through a network connected client device, such as smart phones, tablets, and the like.

Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations include systems and methods for asset streaming and delivery including. In various implementations, a request to exploit an asset virtualized on the asset streaming client is intercepted at the asset streaming client. The asset is identified and an asset snapshot of the asset is obtained. Portions of the asset needed to exploit the asset according to the intercepted request exploit the asset are determined from an asset snapshot of the asset. The portions of the asset needed to exploit the asset according to the intercepted request are obtained and the asset is exploited according to the intercepted request using the portions of the asset.

These and other advantages will become apparent to those skilled in the relevant art upon a reading of the following descriptions and a study of the several examples of the drawings.

DETAILED DESCRIPTION

Figure 1:
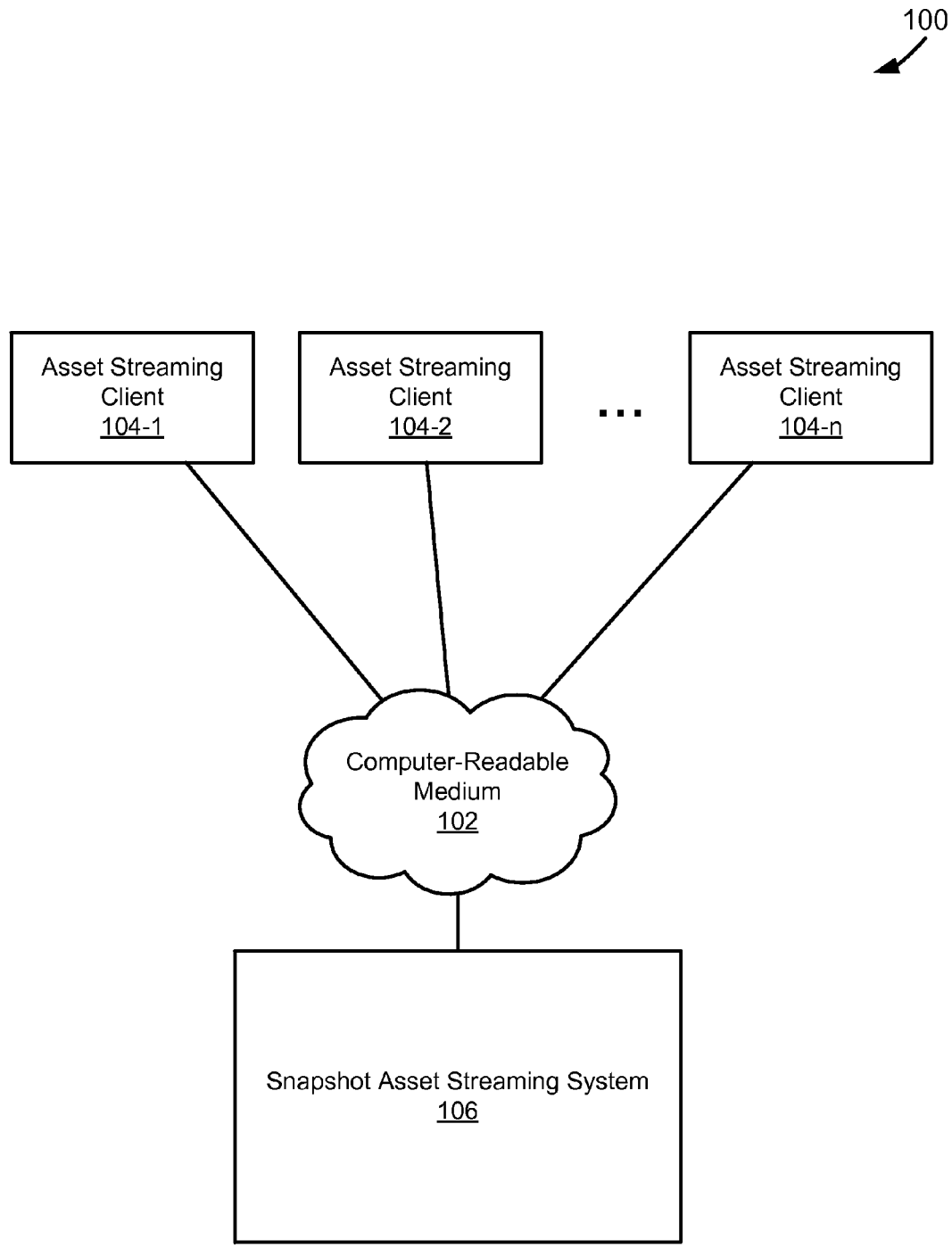
FIG. 1 depicts a diagram of an example of a system for streaming assets to clients using an asset snapshot.

FIG. 1 depicts a diagram 100 of an example of a system for streaming assets to clients using an asset snapshot. The example system shown in FIG. 1 includes a computer-readable medium 102, asset streaming clients 104-1 to 104-n (hereinafter collectively referred to as "asset streaming client 104"), and a snapshot asset streaming system 106. In the example system shown in FIG. 1, the asset streaming client 104 is coupled to the snapshot asset streaming system 106 through the computer-readable medium 102.

As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the asset streaming client 104, the snapshot asset streaming system 106 and other applicable systems, or devices described in this paper can be implemented as a computer system or parts of a computer system or a plurality of computer systems. A computer system, as used in this paper, can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the asset streaming client 104 can be an applicable system for sending and receiving data. Depending upon implementation-specific or other considerations, the asset streaming client can be a system that relies on another system, such as the snapshot asset streaming system 106 to perform a portion of its computational roles. For example, the asset streaming client 104 can be a thin client or an ultra-thin client.

In a specific implementation, the asset streaming client 104 functions to send data. In sending data, the asset streaming client 104 can send requests for assets. Depending upon implementation-specific or other considerations, the asset streaming client 104 can send a request for a portion of an asset. As used herein, an "asset" can be content accessed or generated by a computer-based process. By way of example, an asset can include applications, such as games, document-based applications (e.g., word processing or spreadsheet applications), operating systems, image-related applications, video-related applications, and the like. Assets can also include entertainment or media content, such as movies, music, and electronic books, newspapers, and magazines. Further depending upon-implementation specific or other considerations, an asset can be an operating system.

In a specific implementation, the asset streaming client 104 functions to receive data. In receiving data, the asset streaming client 104 can receive an asset or portions of an asset. The asset streaming client 104 can receive an asset or a portion of an asset that is streamed to the asset streaming client 104. An asset or a portion of an asset that is streamed to the asset streaming client 104-1 can be a stream-enabled asset or part of a stream-enabled asset. As understood herein, a "stream-enabled asset" is an asset (e.g., conventionally-coded application) that at least part of, is broken into portions (e.g., blocks, chunks, pages, etc.), such that the asset can be streamed on a per-portion basis to the asset streaming client 104. A stream-enabled asset or a portion of a stream-enabled asset can be stored as compressed data in order to reduce the amount of bandwidth that is required to stream the stream-enabled asset or portion of the stream-enabled asset to the asset streaming client 104. A stream-enabled asset or a portion of a stream-enabled asset can also be stored as encrypted data.

In a specific implementation, the asset streaming client 104 functions to generate a request for an asset snapshot and receive an asset snapshot. In generating a request for an asset snapshot, the asset streaming client 104 can detect a request for an asset (e.g., a user of the asset streaming client 104 has purchased an asset, such as a music, from an asset marketplace). The asset streaming client 104 can generate a request for an asset snapshot of an asset based on detecting a request for the asset. A generated request for an asset snapshot can be sent by the asset streaming client 104 to an applicable system, such as the snapshot asset streaming system 106. In response to receiving a request for an asset snapshot from the asset streaming client 104, an applicable system, such as the snapshot asset streaming system 106, can send a requested asset snapshot to the asset streaming client 104.

In a specific implementation, an asset snapshot received by the asset streaming client 104 can inform the asset streaming client 104 what characteristics the asset would have if installed completely on the asset streaming client 104. Additionally, an asset snapshot received by the asset streaming client 104 can inform the asset streaming client 104 what portions of the asset are needed and the order in which the portions of assets are needed to exploit the asset in accordance with specific characteristics of the asset. For example, if an asset is a word processing application, then an asset snapshot for the asset can specify what portions of the asset are needed to change a font in the word processing application. In another example, if an asset is a game, then an asset snapshot for the asset can specify what portions of the asset are needed to run different levels in the game. As a result, an asset can be virtualized on the asset streaming client 104, thereby appearing to reside entirely on the asset streaming client 104 even if only portions of the asset reside on the asset streaming client 104. An asset snapshot received by the asset streaming client 104 can also specify portions of an asset that are needed to initiate exploitation of the asset streaming client 104, or portions of an asset that will cause delay in the exploitation of the asset if they do not reside on the asset streaming client 104.

In a specific implementation, the asset streaming client 104 functions to request and receive a portion of an asset based on a snapshot of the asset. For example, if an asset snapshot indicates that a specific portion of an asset is necessary to continue exploitation of an asset, the asset streaming client 104 can request the specific portion of the asset. The asset streaming client 104 can request and receive a specific portion of an asset based on a characteristic of the asset specified by a snapshot of the asset. For example, if an asset snapshot indicates that a specific portion of an asset is necessary to exploit the asset according to a characteristic of the asset (e.g. changing a font in a word processing application), then the asset streaming client 104 can request and receive the specific portion of the asset. Depending upon implementation-specific or other considerations, the asset streaming client 104 can receive a portion of an asset based on a snapshot of the asset and a manner in which a user using the asset streaming client 104 exploits the asset. For example, if the asset is a game, and a user of the asset streaming client 104 wants to continue to the next level, then the asset streaming client 104 can request and receive specific portions of the asset, indicated by a snapshot of the asset as necessary to run the next level in the game.

In a specific implementation, the asset streaming client 104 functions to request and receive jumpstart portions of an asset. As used herein "jumpstart portions of an asset" include portions of the asset that allow exploitation of the asset to initiate and/or that have been determined to cause potential delay in the exploitation of the asset if they do not reside on the asset streaming client 104 (e.g., portions of the asset that are inevitably run during an early part of an application's execution). Depending upon implementation-specific or other considerations, the asset streaming client can request and receive jumpstart portions of an asset based on a snapshot of the asset. For example, if an asset snapshot specifies a specific portion of an asset necessary to begin exploitation of the asset, the asset streaming client 104 can request and receive the specific portion of the asset specified by the snapshot of the asset.

In a specific implementation, the asset streaming client 104 functions to exploit a received asset or portion of an asset. As used herein, "exploiting" an asset can include interacting with content of the asset, viewing or displaying content of the asset or running or executing an application of or associated with the asset. The streaming clients 104 can exploit assets based on, at least in part, the type of asset. For example, if the asset is associated with an application, exploitation of the asset can include executing the application.

In a specific implementation, the asset streaming client 104 can exploit an asset based on received portions of the asset. For example, if a portion of an asset is part of an application, the asset streaming client 104 can run the part of the application that is contained in or associated with the portion of the asset. Depending upon implementation-specific or other considerations, the asset streaming client 104 can exploit an asset after a portion of the asset is received and stored locally in the asset streaming client 104. For example, the asset streaming client 104 can exploit an asset after a portion of the asset is received and stored locally in cache memory of the asset streaming clients 104. Local cache memory of the asset streaming client 104 can be updated as new assets or portions of assets are received and stored in the local cache memory. Depending upon implementation-specific or other considerations, updating local cache memory can include deleting old assets or portions of assets from the local cache memory. Further depending upon implementation-specific or other considerations, old assets or portions of assets can be deleted from local cache memory based upon the length of time since they were last exploited by the asset streaming client 104.

In a specific implementation, the asset streaming client 104 functions to begin exploiting an asset once it has received a sufficient number of portions (e.g., portions received reach or surpass an executable threshold) of the asset. Additionally, the asset streaming client 104 can continue to exploit an asset by receiving from an applicable system, such as the snapshot asset streaming system 106, additional portions of the asset that are not stored on or do not reside locally on the asset streaming client 104 but are possibly needed to continue exploiting the asset.

In a specific implementation, the snapshot asset streaming system 106 functions to provide an asset or portions of an asset to the asset streaming clients 104. For example, the snapshot asset streaming system 106 can send a portion of an asset that is necessary for the continued exploitation of the asset on the asset streaming client 104. The snapshot asset streaming system 106 can send an asset or portions of an asset to the asset streaming client 104 by streaming the asset or portions of the asset to the asset streaming client 104. The snapshot asset streaming system 106 can send an asset or a portion of an asset to the asset streaming client 104 based on a request for an asset or a portion of an asset received from the asset streaming client 104. In the example implementation, the snapshot asset streaming system 106 functions to serve content. Accordingly, in this example, the snapshot asset streaming server 106 can be referred to as a content server. A web server, which is one type of content server, is typically at least one computer system that operates as a server computer system and is configured to operate with the protocols of the World Wide Web and is coupled to the Internet. Unless context dictates otherwise, a server as used in this paper includes at least a portion of a computer system running server software.

In a specific implementation, the snapshot asset streaming system 106 functions to provide a snapshot of an asset to the asset streaming client 104. Depending upon implementation-specific or other considerations, in providing an asset snapshot, the snapshot asset streaming system 106 can generate a snapshot of an asset. The snapshot asset streaming system 106 can generate a snapshot of an asset by exploiting the asset. In exploiting an asset, the snapshot asset streaming system 106 can exploit the asset on a test bed machine. By exploiting an asset, the snapshot asset streaming system 106 can determine what portions of the asset are needed and the order that the portions of the assets are needed to begin exploiting or continue exploiting the asset based on characteristics of the asset. For example, if an asset is a gaming applicant, the snapshot asset streaming system 106 can run the game to generate a snapshot of the game. Further in the example, running the game on the snapshot asset streaming system 106 allows the snapshot asset streaming system 106 to determine the characteristics of the game that can form, at least in part, the snapshot of the game. Additionally in the example, running the game on the snapshot asset streaming system 106 allows the snapshot asset streaming system to determine portions of the game necessary to exploit the asset based on characteristics of the game (e.g. running a specific level in the game). Further depending upon implementation-specific or other considerations, the snapshot asset streaming system 106 can receive an asset snapshot from a system or entity external to the snapshot asset streaming system 106, such as the developer of the asset.

In a specific implementation, the snapshot asset streaming system 106 functions to provide an access control token for an asset to the asset streaming client 104. The access control token can signify that the asset streaming client 104 has a right to receive and exploit a specific asset.

In a specific implementation, the snapshot asset streaming system 106 functions to break up an asset into a stream-enabled asset. Depending upon implementation-specific or other considerations, the snapshot asset streaming system 106 can break up an asset into a stream-enabled asset or portions of a stream-enabled asset by exploiting the asset on a test bed machine. In breaking up an asset, the snapshot asset streaming system 106 can break up the asset into a stream-enabled asset based on characteristics of the asset and the manner in which the asset can be exploited. For example, if an asset is a game, the snapshot asset streaming system 106 can break up portions of the asset that are necessary to run a level within the game. In another example, if an asset is a word processing application, the snapshot asset streaming system 106 can break up portions of the asset that are necessary to change the font in the word processing application. The snapshot asset streaming system 106 can also break up an asset into a stream-enabled asset based on characteristics of a network, through which the stream-enabled asset or portions of the stream-enabled asset will be sent or streamed to the asset streaming client 104. For example if a network, through which a stream-enabled asset or portions of a stream-enabled asset will be streamed to the asset streaming client 104 has a maximum bandwidth, then the snapshot asset streaming system 106 can break up an asset into a stream-enabled asset with portions of sizes appropriate for sending the stream-enabled asset or portions of the stream-enabled asset through the network.

In an example of operation of the example system shown in FIG. 1, the asset streaming client 104 generates and sends a request for an asset snapshot from the snapshot asset streaming system 106. Further in the example of operation of the example system shown in FIG. 1, the asset streaming client 104 receives an asset snapshot from the snapshot asset streaming system 106. The asset streaming client 104 can use an asset snapshot to request portions of an asset to begin exploitation of the asset. Additionally in the example of operation, the asset streaming client 104 can receive portions of an asset from the snapshot asset streaming system 106 and begin exploiting the asset using the received portions of the asset.

Figure 2:
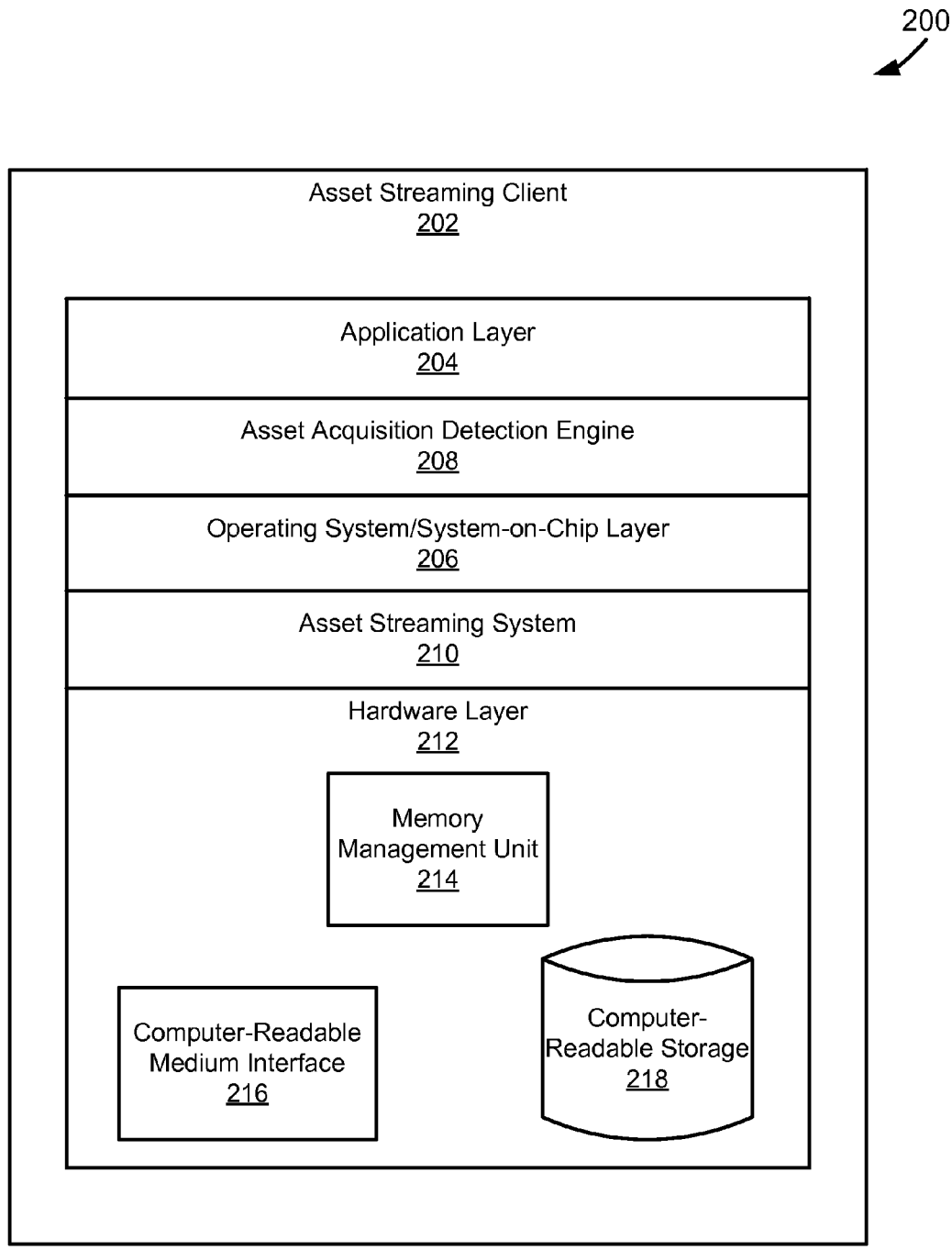
FIG. 2 depicts a diagram of an example of an asset streaming client for exploiting an asset.

FIG. 2 depicts a diagram 200 of an example of an asset streaming client 202 for exploiting an asset. In a specific implementation, the asset streaming client 202 can function according to an applicable client for receiving streamed assets, such as the asset streaming clients described in this paper. The asset streaming client 202 can function to send requests for portions of assets and receive portions of assets that are streamed to the asset streaming client. The asset streaming client 202 can receive portions of assets from an applicable system for streaming portions of assets to the asset streaming client 202, such as the snapshot asset streaming systems described in this paper.

The asset streaming client 202 includes an application layer 204, an operating system/system-on-chip layer 206, an asset acquisition detection engine 208, an asset streaming engine 210, and a hardware layer 212. In a specific implementation, the application layer 204 of the asset streaming client 202 functions to support an asset that is an application. Specifically, an asset that is an application resides and operates within the application layer 204. Depending upon implementation-specific or other considerations, an asset exploited in the application layer 204 does not reside in its entirety on the asset streaming client 202. As a result, the application layer 204 can serve as a virtual exploitation environment in which a virtualized asset that is an application resides and operates. The application layer 204 can function to support an application in accordance with the Open Systems Interconnection (hereinafter referred to as "OSI") model. In the OSI model, the definition of the application layer distinguishes explicit functionality on top of the transport layer at two additional levels, the presentation layer and the session layer. Common application layer services, such as by way of example but not limitation, virtual file, virtual terminal, and job transfer and manipulation protocols, can provide semantic conversion between application processes. As used in this paper, the application layer 204 can be associated with the OSI model, some other applicable known or convenient model, or no model at all.

In a specific implementation, the operating system/system-on-chip layer 206 functions to support exploitation of an operating system. Depending upon implementation-specific or other considerations, the operating system/system-on-chip layer 206 supports execution of an operating system that is streamed to the asset streaming client 202 as an asset or portions of an asset. Further depending upon implementation-specific or other considerations, an operating system exploited in the operating system/system-on-chip layer 206 does not reside in its entirety on the asset streaming client 202. As a result, the operating system/system-on-chip layer 206 serves as a virtual exploitation environment in which a virtualized operating system resides and operates. An operating system supported by the operating system/system-on-chip layer 206 can be used to control exploitation of an application in the application layer 204. For example, an operating system supported by the operating system/system-on-chip layer 206 can receive requests, including requests for data from an application residing in the application layer 204.

In a specific implementation, the asset acquisition detection engine 208 functions to intercept requests for assets or portions of assets generated by applications executed in the application layer 204. The asset acquisition detection engine 208 can intercept requests to begin exploiting an application in the application layer or for portions of assets that are needed to continue to run an application supported and executed in the application layer 204. Depending upon implementation-specific or other considerations, the asset acquisition detection engine 208 can send intercepted requests from the application layer 204 to the asset streaming system 210 without sending the intercepted requests to an operating system supported in the operating system/system-on-chip layer 206. The asset acquisition detection engine 208 in sending intercepted requests from the application layer 204 to the asset streaming system 210 without sending the intercepted requests to an operating system supported in the operating system/system-on chip layer 206 can limit the possibility that the application will crash in the application layer 204, in the event that portions of an asset necessary to continue to exploit the application do not reside locally at the asset streaming client 202.

In a specific implementation, the asset streaming system 210 functions to receive requests intercepted by the asset acquisition detection engine 208 and generated by the application layer 204. Depending upon implementation-specific or other considerations, the asset streaming system 210 is implemented at an abstraction layer that is part of the operating system/system-on-chip layer 206 or beneath the operating system/system-on-chip layer 206. In being implemented as part of the operating system/system-on-chip layer 206 or at an abstraction layer beneath the operating system/system-on-chip layer 206, depending upon implementation-specific or other considerations, the asset streaming system 210 can function agnostically from an operating system without requiring commands and instructions from an operating system supported in the operating system/system-on-chip layer 206. As a result, the asset streaming system 210 can function to trick an operating system supported in the operating system/system-on-chip layer 206 that the operating system is controlling exploitation of an application in the application layer 204, when in fact the asset streaming system 210 controls exploitation of an asset running in the application layer 204 by receiving intercepted requests from the asset acquisition detection engine 208.

In a specific implementation, the asset streaming system 210 functions to intercept requests from the operating system/system-on-chip layer 206. Specifically, the asset streaming system 210 can intercept requests generated by an operating system supported in the operating system/system-on-chip layer 206. Requests intercepted by the asset streaming system 210 form the operating system/system-on-chip layer 206 can be for portions of an operating system that are necessary for the asset streaming client 202 to continue exploiting the operating system in the operating system/system-on-chip layer 206.

In a specific implementation, the asset streaming system 210 functions to determine if an asset snapshot resides locally on the asset streaming client 202. Specifically, the asset streaming system 210 can determine if an asset snapshot for an asset resides locally on the asset streaming client 202 based on a request intercepted by either or both the asset acquisition detection engine 208 and the asset streaming system 210 itself. For example, the asset acquisition detection engine 208 can intercept a request to begin exploiting an asset. In response, the asset streaming system 210 can determine whether an asset snapshot for the asset that is requested to begin exploitation of resides locally on the asset streaming client 202.

In a specific implementation, the asset streaming system 210 functions to receive an asset snapshot from an applicable system, such as the snapshot asset streaming systems described in this paper. Depending upon implementation-specific or other considerations, the asset streaming system 210 can request and receive an asset snapshot after determining that the asset snapshot does not reside locally on the asset streaming client 202. For example, the asset streaming system 210 can determine that an asset snapshot for an asset that is requested to begin exploitation of does not reside locally on the asset streaming client 202 and subsequently request and receive the asset snapshot for the asset.

In a specific implementation, the asset streaming system 210 functions to determine what portions of an asset are used to begin exploitation of an asset or continue exploitation of an asset based on an asset snapshot. Depending upon implementation-specific or other considerations, the asset streaming system 210 can determine what portions of an asset supported in the application layer 204 are used to exploit the asset in the application layer 204 from a snapshot of the asset. For example, the asset streaming system 210 can determine portions of an asset that is an application exploited in the application layer 204 based on a snapshot of the application. Further depending upon implementation-specific or other considerations, the asset streaming system 210 can determine what portions of an asset supported in the operating system/system-on-chip layer 206 are used to exploit the asset in the operating system/system-on-chip layer 206 based on an asset snapshot. For example, the asset streaming system 210 can determine portions of an asset that is an operating system exploited in the operating system/system-on-chip layer 206 based on a snapshot of the operating system.

In a specific implementation, the asset streaming system 210 functions to determine what portions of an asset are used to begin exploiting or continue exploiting an asset from an asset snapshot based on an intercepted request. Depending upon implementation-specific or other considerations, the asset streaming system 210 can determine what portions of an asset are used to exploit an asset from an asset snapshot based on a request intercepted by the asset acquisition detection engine 208. Further depending upon implementation-specific or other considerations, the asset streaming system 210 can determine what portions of an asset are used to exploit an asset from an asset snapshot based on a request intercepted by the asset streaming system 210 from the operating system/system-on-chip layer 206. The asset streaming system 210, in response to a request to begin exploitation of an asset, can receive jumpstart portions of the asset. For example, if the asset acquisition detection engine 208 intercepts a request to begin exploiting an asset, then the asset streaming system 210 can determine jumpstart portions of the asset that are used to begin exploiting the asset based on a snapshot of the asset. Similarly, if the asset acquisition detection engine 208 intercepts a request to continue exploiting an asset, then the asset streaming system 210 can determine jumpstart portions of the asset that are used to continue exploiting the asset based on a snapshot of the asset.

In a specific implementation, the asset streaming system 210 functions to determine what portions of an asset are used to exploit an asset from an asset snapshot and a characteristic of an asset indicated by intercepted requests. Depending upon implementation-specific or other considerations, the asset streaming system 210 can determine what portions of an asset are used to exploit an asset from an asset snapshot based on a request intercepted by the asset acquisition detection engine 208 or a request intercepted by the asset streaming system 210 from the operating system/system-on-chip layer 206. For example if requests intercepted by the asset acquisition detection engine 208 indicate that an asset streaming client 202 wants to begin exploitation of an asset that is a game in the second level of the game, then the asset streaming system 210 can determine the portions of the asset that are necessary to begin exploitation of the second level of the game. In another example, if requests intercepted by the asset acquisition detection engine 208 indicate that an asset streaming client 202 wants to change a font in an asset that is a word processing application, then the asset streaming system 210 can determine the portions of the asset that are necessary to change the font of the word processing application.

In a specific implementation, the asset streaming system 210 functions to determine if an asset or portions of an asset resides locally on the asset streaming client 202. Depending upon implementation-specific or other considerations, the asset streaming system 210 can determine if assets or portions of an asset used to exploit or continue to exploiting an asset reside locally on the asset streaming client 202. Specifically, in determining whether an asset or portions of an asset reside locally on the asset streaming client 202, the asset streaming system 210 can determine whether assets or portions of assets are stored locally in a computer-readable storage 218 in the hardware layer 212 of the asset streaming client 202. The computer-readable storage 218 is implemented as part of cache of the asset streaming client 202. The memory management unit 214 can determine whether an asset or a portion of an asset resides locally on the asset streaming client 202 through a computer-readable medium interface 216, implanted as part of the hardware layer 212.

In a specific implementation, the asset streaming system 210 functions to instruct a memory management unit 214 implemented in the hardware layer to determine whether an asset or a portion of an asset resides locally on the asset streaming client 202. The asset streaming system 210 can instruct the memory management unit 214 to determine whether an asset or a portion of an asset resides locally on the asset streaming client 202 in response to a request to begin exploiting an asset or continue exploiting an asset intercepted by the asset acquisition detection engine 208. Additionally, the asset streaming system 210 can instruct the memory management unit 214 to determine whether an asset or a portion of an asset resides locally on the asset streaming client 202 based on an asset snapshot. For example, if an intercepted request indicates that the asset streaming client 202 wants to begin exploiting level 2 of a game, then the asset streaming system 210 can determine a portion of the game that is necessary to begin exploitation of level 2 of the game and instruct the memory management unit 214 to determine whether the portion of the game resides locally on the asset streaming client 202.

In a specific implementation, the asset streaming system 210 can function to request and receive assets or portions of assets that the asset streaming system 210 determines do not reside locally on the asset streaming client 202. Depending upon implementation-specific or other considerations, the asset streaming system 210 can determine assets or portions of assets that do not reside locally based on an asset snapshot. For example, if the asset streaming system 210 determines that a portion of an asset that is necessary to exploit level 2 of an asset that is determined to not reside locally on the asset streaming client 202, then the asset streaming system 210 can request the portions of the assets. In various implementations, the asset streaming system 210 can request and receive an asset or a portion of an asset from an applicable system for providing an asset or a portion of an asset, such as the snapshot asset streaming systems described in this paper.

In a specific implementation, an asset or a portion of an asset requested by the asset streaming system 210 is stored in the computer-readable storage 218. Depending upon implementation-specific or other considerations, the computer-readable storage 218 can store an asset or a portion of an asset that is received by the asset streaming system 210. The asset streaming system 210 can receive an asset or a portion of an asset form an applicable system for providing an asset or a portion of an asset, such as the snapshot asset streaming systems described in this paper. Further depending upon implementation-specific or other considerations, the computer-readable storage 218 can receive an asset or a portion of an asset to store through the computer-readable medium interface 216. For example, the computer-readable storage 218 can receive portions of assets that are streamed to the asset streaming client 202 through the computer-readable medium interface 216. Further depending upon implementation-specific or other considerations, the computer-readable medium interface 216 can receive an asset or a portion of an asset that is requested by the asset streaming system 210 based on an asset snapshot.

In a specific implementation, the asset streaming system 210 receives an asset or a portion of an asset that is stored locally on the asset streaming client 202 in the computer-readable storage 218. The asset streaming system 210 can instruct the memory management unit 214 to determine whether an asset or a portion of an asset resides locally in the computer-readable storage 218 and retrieve the asset or the portion of the asset if it does reside locally in the computer-readable storage 218.

In a specific implementation, the asset streaming system 210 provides an asset or a portion of an asset to the application layer 204 based on a request intercepted by the asset acquisition detection engine 208. The asset streaming system 210 can provide an asset or a portion of an asset to the application layer 204 from a local storage, such as the computer-readable storage. The asset streaming system 210 can receive an asset or a portion of an asset form an applicable system for providing an asset or a portion of an asset, such as the asset snapshot streaming systems described in this paper, store the asset or the portion of the asset locally and provide the asset or the portion of the asset to an asset running in an appropriate abstraction layer. For example, if an asset is an application supported in the application layer 204, then the asset streaming system 210 can provide an asset or a portion of an asset to the application layer 204. In another example, if an asset is an operating system supported in the operating system/system-on-chip layer 206, then the asset streaming system 210 can provide an asset or a portion of an asset to the operating system/system-on-chip layer 206.

In an example of operation of the example system shown in FIG. 2, the application layer 204 functions to support applications exploited on the asset streaming client 202. Further in an example of operation of the example system shown in FIG. 2, the operating system/system-on-chip layer 206 functions to support an operating system exploited on the asset streaming client 202. In the example of operation, the asset acquisition detection engine 208 intercepts requests generated by asset supported in the application layer 204. The asset acquisition detection engine 208 sends intercepted requests to the asset streaming system 210.

In the example of operation of the example system shown in FIG. 2, the asset streaming system 210 determines whether an asset or a portion of an asset that is the subject of a request intercepted by the asset acquisition detection engine 208 resides locally on the asset streaming client 202. Further in the example of operation, the asset streaming client 210 can send a request for and receive an asset or a portion of an asset if it determined that the asset or the portion of the asset does not reside locally on the asset streaming client 202. The asset streaming system 210 can provide an asset or a portion of an asset to the application layer 204 to begin or continue exploitation of the asset in the application layer 204.

Figure 3:
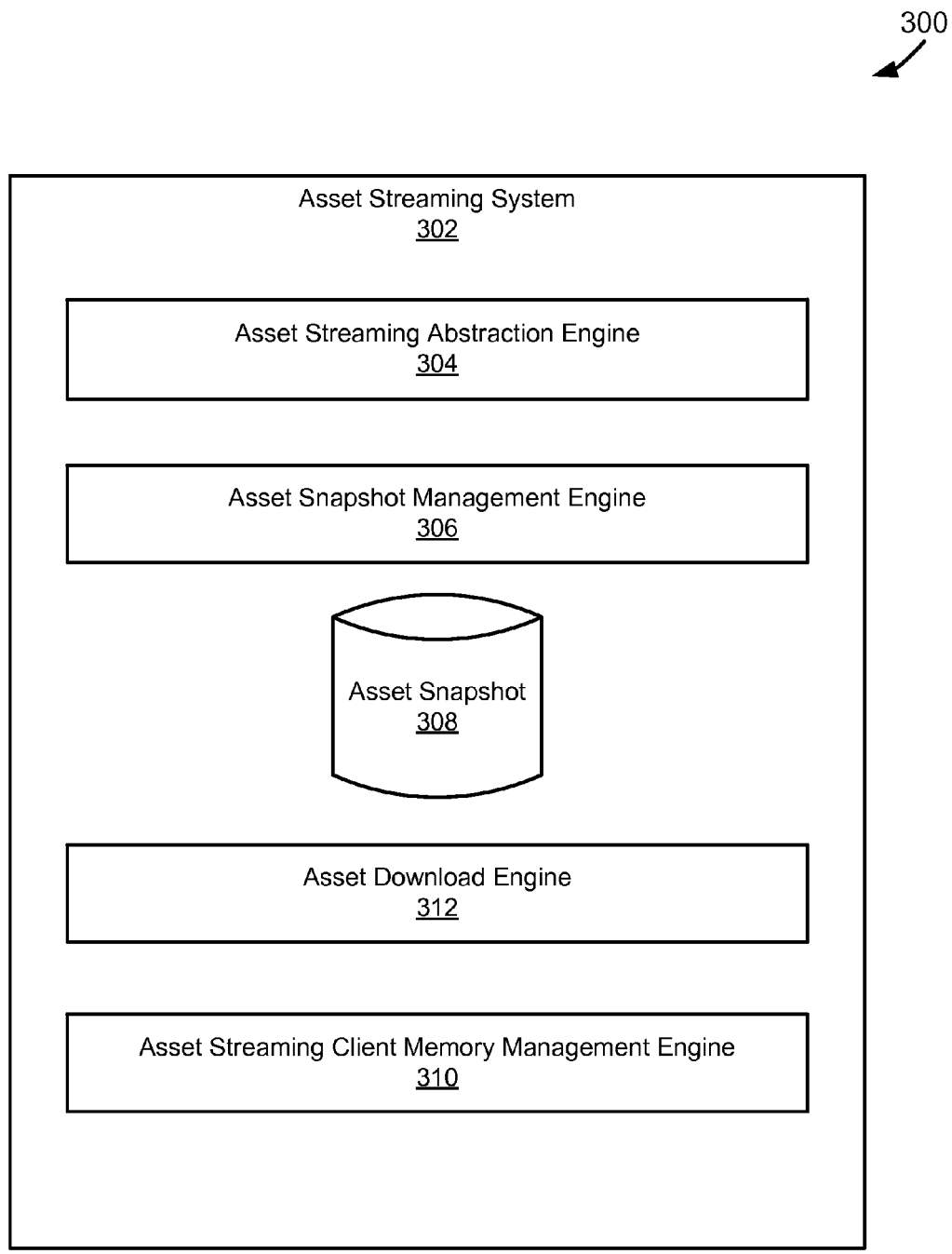
FIG. 3 depicts a diagram of an example of an asset streaming system for managing assets exploited by an asset streaming client.

FIG. 3 depicts a diagram 300 of an example of an asset streaming system for managing assets exploited by an asset streaming client. In a specific implementation, the asset streaming system 302 can functions according to an applicable system for managing assets exploited by an asset streaming client, such as the asset streaming systems described in this paper. Depending upon implementation-specific or other considerations, the asset streaming system 302 can manage exploited assets that are virtualized on an asset streaming client. Specifically, in being virtualized on an asset streaming client, portions of an asset can reside at locations external to the asset streaming client, and can be retrieved for the asset streaming client, as the asset streaming client needs the portions of the asset. As a result, the asset streaming client can retrieve portions of assets as needed, such that the asset streaming client is tricked into thinking that the portions of assets reside locally on the asset streaming client.

The asset streaming system 302 includes an asset abstraction engine 304, an asset snapshot management engine 306, an asset snapshot datastore 308, an asset streaming client memory management engine 310, and an asset download engine 312. In a specific implementation, the asset streaming abstraction engine 304 functions to receive intercepted requests. Depending upon implementation-specific or other considerations, the asset streaming abstraction engine 304 can receive requests intercepted for an application that is or will be exploited in an application layer. Further depending upon-implementation specific or other considerations, the asset streaming abstraction engine 304 can receive requests intercepted for an operating system that is or will be exploited in an operating system layer. Intercepted requests received by the asset streaming abstraction engine 304 can include requests to begin exploiting an asset. Intercepted requests received by the asset streaming abstraction engine 304 can include requests for portions of assets necessary to continue exploiting an asset. Additionally, the asset streaming abstraction engine 304 can receive requests to exploit an asset according to a specific characteristic of the asset. For example, if the asset is a word processing application, then the asset streaming abstraction engine 304 can receive a request to change a font in the word processing application.

In a specific implementation, the asset streaming abstraction engine 304 can function to identify an asset based on received intercepted requests. Additionally in the specific implementation, the asset streaming abstraction engine 304 can receive an asset snapshot for an identified asset from the asset snapshot management engine 306. Specifically, the asset streaming abstraction engine 304 can instruct the asset snapshot management engine 306 to return an asset snapshot for an identified asset.

In a specific implementation, the asset snapshot management engine 306 can determine whether an asset snapshot for a specific asset is stored in the asset snapshot datastore 308. Specifically, the asset snapshot management engine 306 can determine whether an asset snapshot for an asset identified by the asset streaming abstraction engine 304 is stored in the asset snapshot datastore 308. Depending upon implementation-specific or other considerations, the asset snapshot management engine 306 can determine whether an asset snapshot, for an asset identified by the asset streaming abstraction engine 304 based on an intercepted request, is stored in the asset snapshot datastore 308. For example, if the asset streaming abstraction engine 304 determines from an intercepted request that an asset streaming client wants to begin exploiting a game, then the asset snapshot management engine 306 can determine whether an asset snapshot for the game is stored in the asset snapshot datastore 308.

In a specific implementation, the asset snapshot management engine 306 can function to generate a request for and receive an asset snapshot. The asset snapshot management engine 306 can generate a request for a specific asset snapshot if it is determined that the specific asset snapshot is not located locally on a streaming client (e.g. in the asset snapshot datastore 308). The asset snapshot management engine can generate a request for an asset snapshot for a specific asset that is identified by the asset streaming abstraction engine 304. For example, if the asset streaming abstraction engine 304 identifies an asset that is a specific game, and the asset snapshot management engine 306 determines that an asset snapshot for the specific game is not at a streaming client, then the asset snapshot management engine 306 can generate a request for the asset snapshot of the game. The asset snapshot management engine 306 can send a request for an asset snapshot and receive the asset snapshot from an applicable system for sending an asset snapshot, such as the snapshot asset streaming systems described in this paper. After receiving an asset snapshot, the asset snapshot management engine 306 can store the received asset snapshot in the asset snapshot datastore 308.

In a specific implementation, the asset snapshot management engine 306 functions to return an asset snapshot to the asset streaming abstraction engine 304. Depending upon implementation-specific or other considerations, the asset snapshot management engine 306 can return an asset snapshot from the asset snapshot datastore 308 to the asset streaming abstraction engine 304. In returning an asset snapshot to the asset streaming abstraction engine 304, the asset snapshot management engine 306 can return an asset snapshot for an asset identified by the asset streaming abstraction engine 304 based on an intercepted request. For example, if the asset streaming abstraction engine 304 determines from an intercepted request that an asset streaming client wants to begin exploiting a word processing application, then the asset snapshot management engine 306 can return an asset snapshot for the word processing application to the asset streaming abstraction engine 304.

In a specific implementation, the asset streaming abstraction engine 304 functions to determine what portions of an asset are used to begin exploiting or continue exploiting an asset from an asset snapshot based on an intercepted request. Depending upon implementation-specific or other considerations, the asset streaming abstraction engine 304 can determine what portions of an asset are used to exploit an asset from an asset snapshot based on a request intercepted from an application exploited in an application layer. Further depending upon implementation-specific or other considerations, the asset streaming abstraction engine 304 can determine what portions of an asset are used to exploit an asset from an asset snapshot based on a request intercepted from an operating system exploited in an operating system layer. In one example, the asset streaming abstraction engine 304, in response to a request to begin exploitation of an asset, can determine portions of an asset, including jumpstart portions of the asset, from an asset snapshot of the asset. Similarly, in response to continue exploitation of an asset, the asset streaming abstraction engine 304 intercepts a request to continue exploiting an asset, then the asset streaming abstraction engine 304 can determine portions of the asset, including jumpstart portions of the asset, that are used to continue exploiting the asset from an asset snapshot of the asset.

In a specific implementation, the asset streaming asset streaming abstraction engine 304 functions to determine what portions of an asset are used to exploit an asset from an asset snapshot and a characteristic of an asset indicated by intercepted requests. Specifically, if intercepted requests indicate a characteristic that an asset streaming client wishes to exploit in an asset, the asset streaming abstraction engine 304 can determine what portions of the asset are used to exploit the asset in accordance with the desired characteristic. For example if intercepted requests indicate that an asset streaming client wants to begin exploitation of an asset that is a game in the second level of the game, then the asset streaming abstraction engine 304 can determine portions of the asset that are necessary to begin exploitation of the second level of the game. In another example, if intercepted requests indicate that an asset streaming client wants to change a font in an asset that is a word processing application, then the asset streaming abstraction engine 304 can determine the portions of the asset that are necessary to change the font of the word processing application.

In a specific implementation, the asset streaming client memory management engine 310 functions to determine if assets or portions of an asset reside locally on an asset streaming client. For example, the asset streaming client memory management engine 310 can determine whether an asset or a portion of an asset is stored locally in the cache of an asset streaming client. Depending upon implementation-specific or other considerations, the asset streaming client memory management engine 310 can determine whether an asset or portions of an asset that the asset streaming abstraction engine 304 determines will be used in exploiting the asset, reside locally on the asset streaming client. For example, if the asset streaming abstraction engine 304 determines that an asset or a portion of an asset is used to begin or continue exploiting an asset, then the asset streaming client memory management engine 310 can determine whether the portion of the asset resides locally on the asset streaming client.

In a specific implementation, the asset streaming client memory management engine 310 functions to return locally stored assets or portions of locally of an asset to the asset streaming abstraction engine 304. Depending upon implementation-specific or other considerations, the asset streaming client memory management engine 310 can return locally stored asset or portions of locally stored assets that the asset streaming abstraction engine determines will be used in exploiting the asset. For example, if the asset streaming abstraction engine 304 determines that an asset or a portion of an asset is used to begin or continue exploiting an asset, and if the asset or the portions of the asset is stored locally on an asset streaming client, then the asset streaming client memory management engine 310 can return the locally stored asset or portion of the asset to the asset streaming abstraction engine 304.

In a specific implementation, the asset streaming client memory management engine 310 functions to inform the asset streaming abstracting engine 304 that an asset or a portion of an asset does not reside locally on an asset streaming client. Further in a specific implementation, the asset streaming abstraction engine 304 instructs the asset download engine 312 to generate and send a request for an asset or a portion of an asset that the asset streaming client memory management engine 310 determines does not reside locally on an asset streaming client. The asset download engine 312 can send a request for an asset or a portion of an asset and receive the asset or a portion of the asset from an applicable system for providing the asset or the portion of the asset, such as the snapshot asset streaming systems described in this paper. Depending upon implementation-specific or other considerations, the asset download engine 312 can provide received assets or portions of assets directly to the asset streaming abstraction engine 304 and/or store the received assets or portions of assets in locally memory, e.g. cache.

In a specific implementation, the asset streaming abstraction engine 304 can provide assets or portions of assets to an asset or an appropriate asset or system for exploitation of the asset. Depending upon implementation-specific or other considerations, the asset streaming abstraction engine 304 can provide assets or portions of assets to an asset or an appropriate asset or system for exploitation of the asset based on an intercepted request for the asset. For example, if an intercepted request indicates a characteristic of an asset that the asset streaming client wishes to exploit, the asset streaming abstraction engine 304 can provide the portions of the asset used to exploit the asset according to the desired characteristic of the asset.

In an example of operation of the example system shown in FIG. 3, the asset streaming abstraction engine 304 determines the identity of an asset based on intercepted requests. Further in the example of operation, the asset snapshot management engine 306 determines whether an asset snapshot for an asset identified by the asset streaming abstraction engine 304 is locally available, e.g. stored in the asset snapshot datastore 308. In the example of operation of the example system shown in FIG. 3, if it is determined that an asset snapshot is not locally available, then the asset snapshot management engine 306 can generate a request for and receive the asset snapshot.

In the example of operation, the asset streaming abstraction engine 304 functions to determine assets or portions of an asset that are used to begin or continue exploitation of an asset based on intercepted requests and an asset snapshot. The asset streaming client memory management engine 310 determines whether assets or portions of an asset are stored locally on an asset streaming client. If it is determined that an asset or portions of an asset are not stored locally on an asset streaming client, then the asset streaming abstraction engine 304 can instruct the asset download engine 312 to generate a request for an received the asset or portions of the asset from an asset provider system. Further in the example of operation, the asset provider system can provide received assets or portions of assets to the asset streaming abstraction engine 304. The asset streaming abstraction engine 304 can provide asset or portions of assets received from the asset download engine 312 to assets or applicable systems used to exploit an asset.

Figure 4:
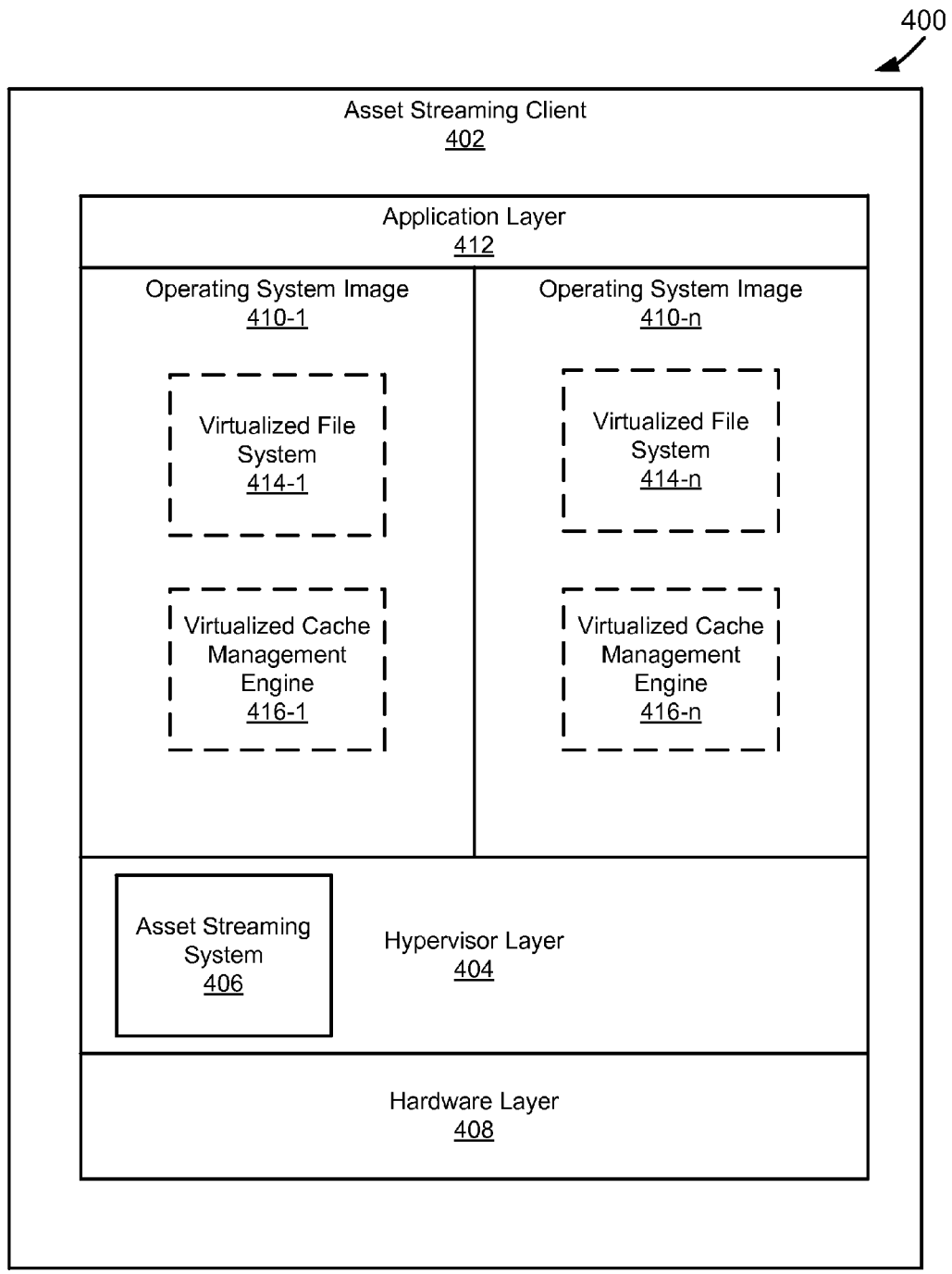
FIG. 4 depicts a diagram of an example of an asset streaming client with virtualized operating systems.

FIG. 4 depicts a diagram 400 of an example of an asset streaming client with virtualized operating systems. In a specific implementation, the asset streaming client 402 can function to support execution of operating systems and applications that are virtualized on the asset streaming client 402.

The asset streaming client 402 includes a hypervisor layer 404, a hardware layer 408, operating system images 410-1 . . . 410-n (hereinafter collectively referred to as "operating system image 410), and application layer 412. The hypervisor layer 404 is implemented between the hardware layer 408 and the operating system image 410 supported in a virtualized operating system layer. The hypervisor layer includes a hypervisor that is integrated with an asset streaming system 406 within the hypervisor layer. The hypervisor functions to create the virtual operating system layer, upon which an operating system represented by the operating system image 410 can run. In representing an operating system through an operating system image 410 an operating system represented by the operating system image 410 is virtualized on the asset streaming client 402. The hypervisor can also manage the execution of an operating system from which the operating system image 410 is created. In managing the operating system, the hypervisor can receive requests for assets or portions of assets from the operating system. The hypervisor can interact with the asset streaming system 406 to retrieve assets or portions of assets, including the operating system that forms the operating system image 410, from either local cache or remote systems and datastores. Depending upon implementation-specific or other considerations, the hypervisor can interact with the asset streaming system 406 to receive assets or portions of assets based on asset snapshots.

In a specific implementation, the application layer 412 supports exploitations of assets that are applications. Exploitation of assets supported by the application layer 412 can be controlled by a virtualized operating system represented by the operating system image 410. The operating system images include corresponding virtualized file systems 414-1 . . . 414-n (hereinafter collectively referred to as "virtualized file system 414") and virtualized cache management engines 416-1 . . . 416-n (hereinafter collectively referred to as "virtualized cache management engine 416"). The virtualized file system 414 is supported in the virtualized operating system layer and functions to control retrieval of assets or portions of assets supported in the application layer 412. The virtualized cache management engine 416 is supported in the virtualized operating system layer and functions to control virtualized cache memory of the virtualized operating system of which the operating system image 410 corresponds.

Figure 5:
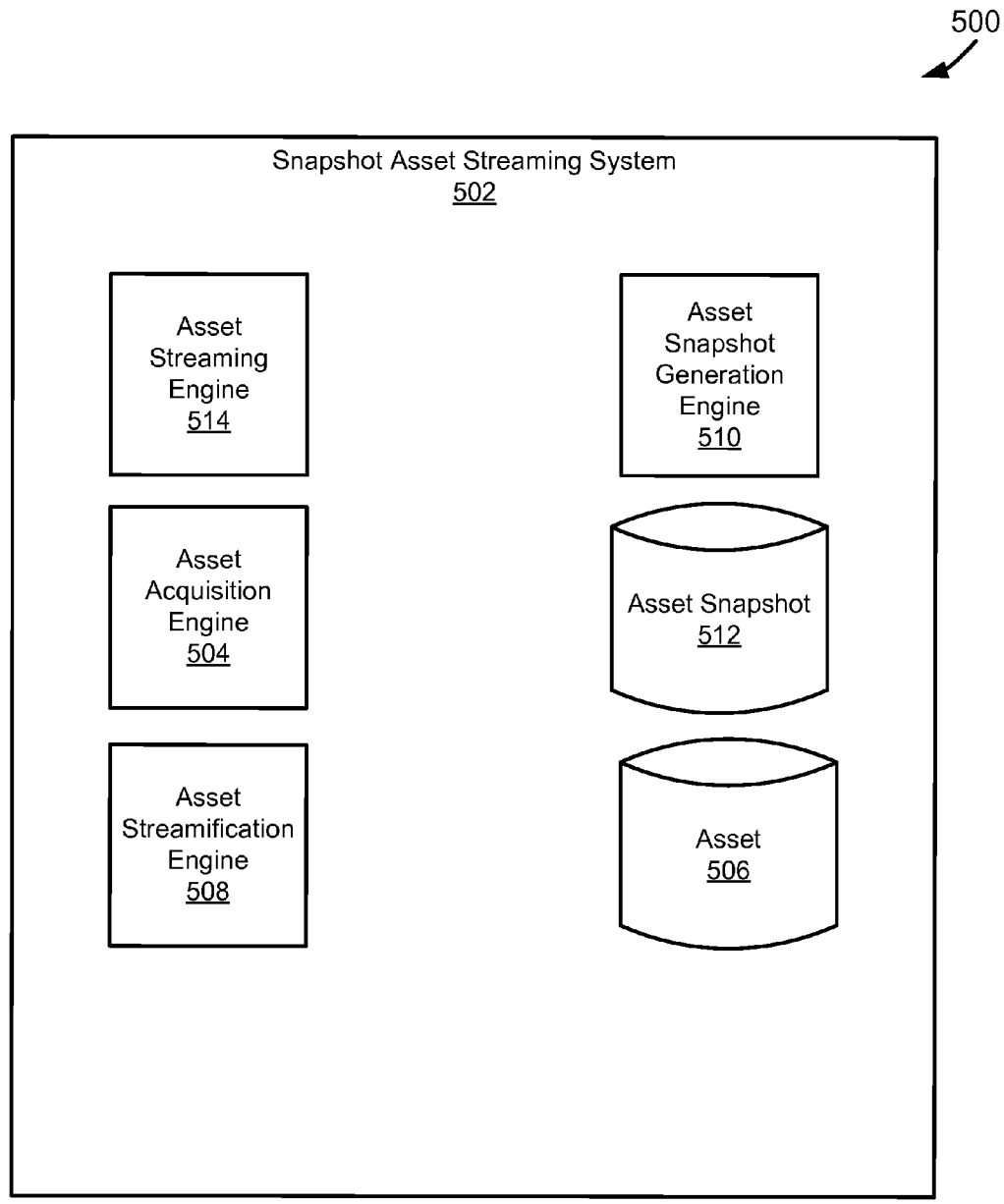
FIG. 5 depicts a diagram of an example of a snapshot asset streaming system.

FIG. 5 depicts a diagram 500 of an example of a snapshot asset streaming system 502. The snapshot asset streaming system can function according to an applicable system for providing assets and an asset snapshot to an asset streaming client, such as the snapshot asset streaming systems described in this paper. The snapshot asset streaming system 502 includes an asset acquisition engine 504, an asset datastore 506, an asset streamification engine 508, an asset snapshot generation engine 510, and an asset streaming engine 514.

In a specific implementation, the asset acquisition engine 504 functions to retrieve assets that can be sent to an asset streaming client. The asset acquisition engine 504 can retrieve an asset from an asset vendor and a license for an asset streaming client to exploit the asset. Depending upon implementation-specific or other considerations, the asset acquisition engine 504 can retrieve an asset after receiving a request to begin exploiting the asset from an asset streaming client. The asset acquisition engine 504 can store a retrieved asset in the asset datastore 506.

In a specific implementation, the asset streamification engine 508 functions to streamify an asset. Streamification of an asset includes breaking up an asset into a stream-enabled asset. Depending upon implementation-specific or other considerations, the asset streamification engine 508 can break up an asset into a stream-enabled asset or portions of a stream-enabled asset by exploiting the asset on a test bed machine to determine which requests will be made and sent to the operating system when the asset is exploited. As a result, requests can be used to spoof a system registry of an asset streaming client. In breaking up an asset, the snapshot asset streamification engine 508 can break up the asset into a stream-enabled asset based on characteristics of the asset and the manner in which the asset can be exploited. For example, if an asset is a game, the snapshot asset streamification engine 508 can break up portions of the asset that are necessary to run a level within the game. The snapshot asset streamification engine 508 can also break up an asset into a stream-enabled based on characteristics of a network, through which the stream-enabled asset or portions of the stream-enabled asset will be sent or streamed to an asset streaming client. For example if a network, through which a stream-enabled asset or portions of a stream-enabled asset will be streamed to an asset streaming client has a maximum bandwidth, then the asset streamification engine 508 can break up an asset into portions of a stream-enabled asset of sizes appropriate for sending the stream-enabled asset or portions of a stream-enabled asset through the network. The asset streamification engine 508 can store stream-enabled assets or portions of stream-enabled assets in the asset datastore 506.

In a specific implementation, the asset snapshot generation engine 510 functions to generate a snapshot of an asset. Depending upon implementation-specific or other considerations, the asset snapshot generation engine 510 can generate a snapshot of an asset by exploiting the asset. In exploiting an asset, the asset snapshot generation engine 510 can exploit the asset on a test bed machine. By exploiting an asset, the asset snapshot generation engine 510 can determine what portions of the asset are needed and the order that the portions of the assets are needed to begin exploiting or continue exploiting the asset based on characteristics of the asset. The asset snapshot generation engine 510 can store generated asset snapshot in the asset snapshot datastore 512

In a specific implementation, the asset streaming engine 514 functions to provide an asset snapshot to an asset streaming client. Depending upon implementation-specific or other considerations, the asset streaming engine 514 can provide an asset snapshot to an asset streaming client after receiving a request for an asset snapshot from the asset streaming client. Further depending upon implementation-specific or other considerations, the asset streaming engine 514 can send to an asset streaming client an asset snapshot of assets that are available for exploitation by the asset streaming client as the asset snapshots are created by the asset snapshot generation engine 510.

In a specific implementation, the asset streaming engine 514 functions to send assets or portions of assets, including stream-enabled assets, to an asset streaming client. Depending upon implementation-specific or other considerations, the asset streaming engine 514 can send assets or portions of assets to an asset streaming client as the asset streaming client sends requests for the assets or portions of assets. Further in the implementation, the asset streaming engine 514 can function to send an access control token for an asset or portions of an asset to an asset streaming client.

In an example of operation of the example system shown in FIG. 5, the asset acquisition engine 504 functions to retrieve assets and store retrieved assets in the asset datastore 506. Further in the example of operation of the example system shown in FIG. 5, the asset streamification engine 508 functions to streamify assets by breaking up an asset into a stream-enabled asset. In the example of operation, the asset snapshot generation engine 510 can generate an asset snapshot for an asset and store the asset snapshot in the asset snapshot datastore 512. Further in the example of operation of the example system shown in FIG. 5, the asset streaming engine 514 can send an asset snapshot and an asset or portions of an asset to an asset streaming client.

Figure 6:
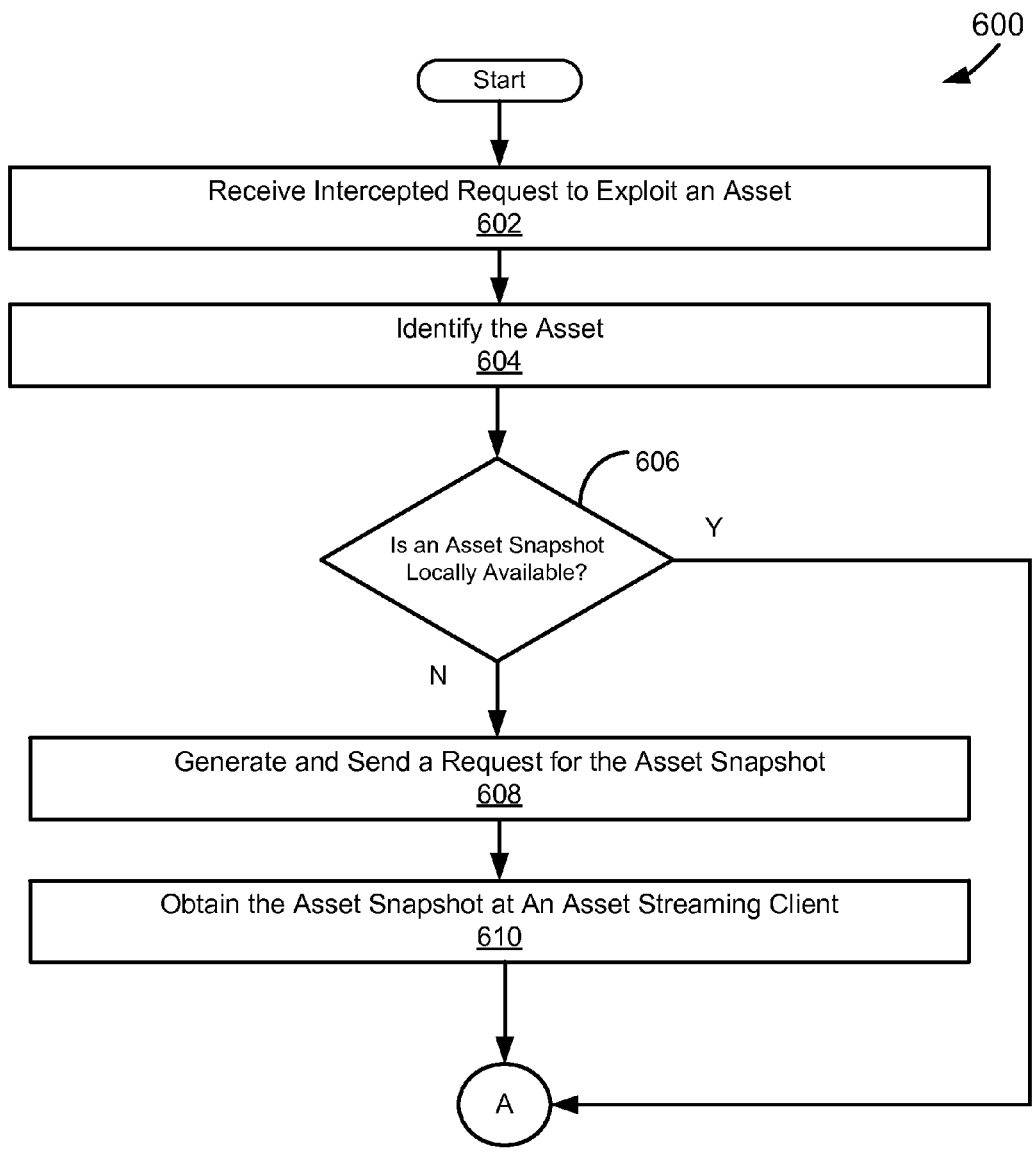
FIG. 6 depicts a flowchart of an example of method for obtaining an asset snapshot.

FIG. 6 depicts a flowchart 600 of an example of method for obtaining an asset snapshot. The example flowchart 600 shown in FIG. 6 begins at module 602, where an intercepted request to exploit an asset is received. Depending upon implementation-specific or other considerations, a request can be intercepted from an application supported in an application layer or an operating system supported in an operating system layer/virtualized operating system layer. Further depending upon implementation-specific or other considerations, an intercepted request can be a request to begin exploiting an asset or continue exploiting an asset.

The flowchart 600 continues to module 604 where an asset is identified based on the received intercepted request. For example, if an intercepted request specifies to begin exploiting an asset that is a game, then the specific game can be identified at module 604. Similarly, if an intercepted request specifies to continue exploiting an asset that is a game being exploited on the asset streaming system, then the specific game can be identified at module 604.

The flowchart 600 continues to decision point 606 where it is determined whether an asset snapshot of an asset identified at module 604 is locally available. For example, at decision point 606 it can be determined whether an asset snapshot is locally available based on whether it is stored in a local asset snapshot datastore. If it is determined at decision point 606 that an asset snapshot is not locally available, then the flowchart 600 continues to module 608.

At module 608, the flowchart 600 includes generated and sending a request for an asset snapshot of an asset identified at module 604. The request for an asset snapshot generated at module 608 can be sent to an applicable system for providing the asset snapshot, such as the snapshot asset streaming systems described in this paper.

The flowchart 600 continues to module 610, where an asset snapshot is obtained. At module 610, an asset snapshot can be obtained at the asset streaming client from an applicable system for providing the asset snapshot, such as the snapshot asset streaming systems described in this paper. Depending upon implementation-specific or other considerations, the asset snapshot can be sent in its entirety to an asset streaming client or streamed to the asset streaming client in pieces.

Figure 7:
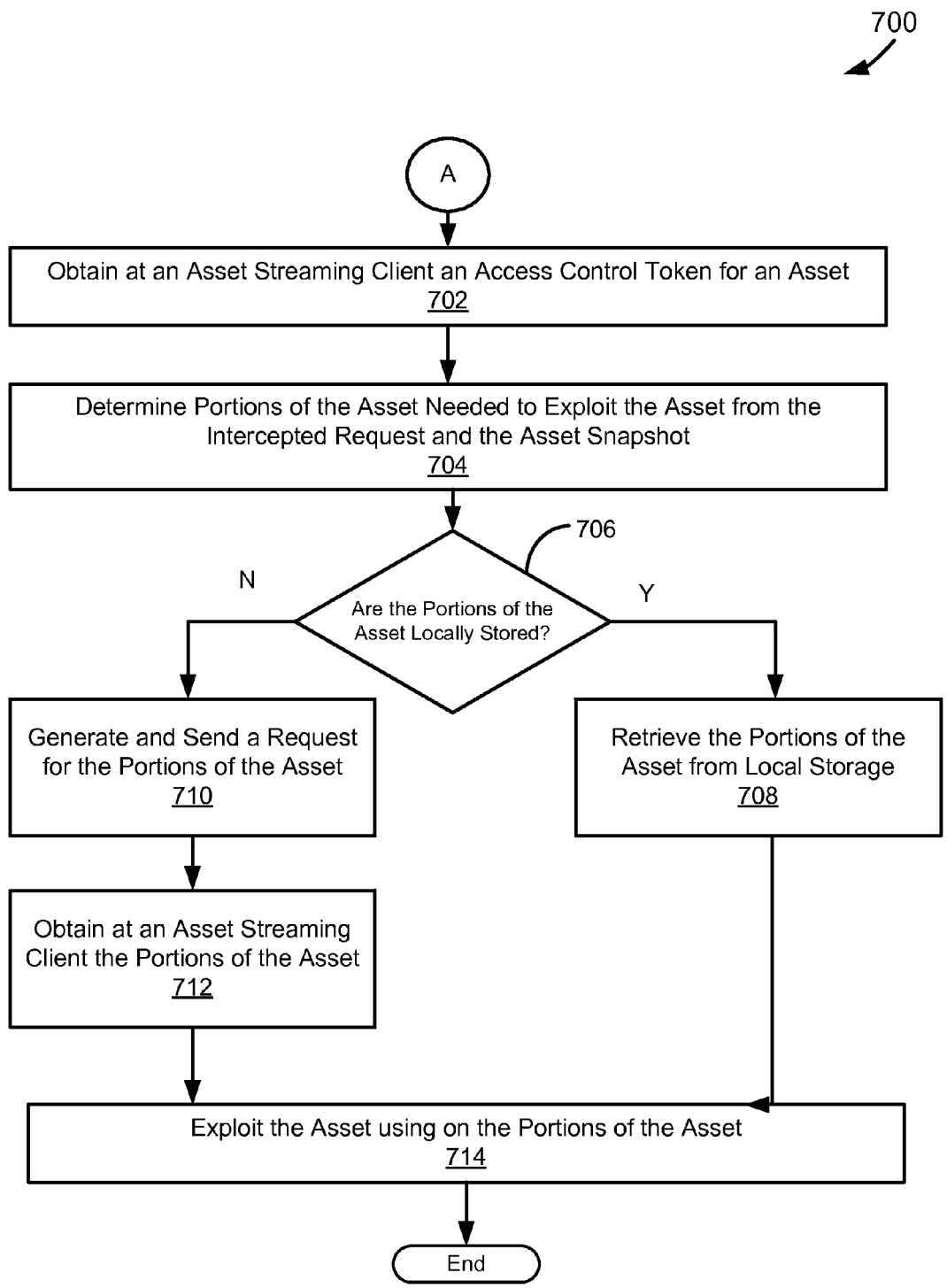
FIG. 7 depicts a flowchart of an example of method of obtaining portions of an asset based on an asset snapshot.

FIG. 7 depicts a flowchart 700 of an example of method of obtaining portions of an asset based on an asset snapshot.

The flowchart 700 begins at module 702 where an access control token is received for an asst. An access control token received at module 702 by an asset streaming client can signify that the asset streaming client has a right to receive and exploit a specific asset.

The flowchart 700 continues to module 704, where portions of an asset needed to exploit the asset is determined based on intercepted requests and the asset snapshot. For example, an intercepted request can indicate a characteristic of an asset that the asset streaming client wishes to exploit an asset. Portions of an asset needed to exploit the asset according to the desired characteristic can be determined from an asset snapshot. In another example, an intercepted request can indicate a desire by the asset streaming client to begin exploiting an asset. Jumpstart portions of an asset needed to begin exploiting the asset identified by the intercepted request can be determined from the asset snapshot.

The flowchart 700 continues to decision point 706, where it is determined whether portions of an asset identified at module 704 are locally stored at an asset streaming client. An asset streaming client memory management engine 310 can determine whether portions of an asset are stored locally at the asset streaming client using a memory management unit.

If it is determined at decision point 706 that the portions of the asset identified at module 704 are locally stored on the asset streaming client, then the flowchart 700 continues to module 708. At module 708, the flowchart 700 includes retrieving the portions of the assets from local storage. Local storage can include the cache of an asset streaming client. For example, a memory management unit can retrieve the portions of the assets from local storage.

If it is determined at decision point 706 that the portions of the asset identified at module 704 are not locally stored, then the flowchart 700 continues to module 710. At module 710, the flowchart includes generating and sending requests for the portions of the assets that it is determined are not locally stored on the asset streaming client. The requests for the portions of the assets can be sent to an applicable system for providing the portions of the assets to the asset streaming client, such as the asset snapshot provider systems described in this paper.

The flowchart 700 continues to module 712, where the portions of the assets identified at module 704 are obtained at the asset streaming client. In obtaining the portions of the assets, the portions of the assets can be streamed to the asset streaming client.

The flowchart 700 continues to module 714 where the asset is exploited using the portions of the assets. In exploiting the asset, the portions of the assets can be provided to applicable assets or systems used to exploit the asset. For example, the portions of the assets can be provided to an operating system to begin or continue exploiting an application.

Figure 8:
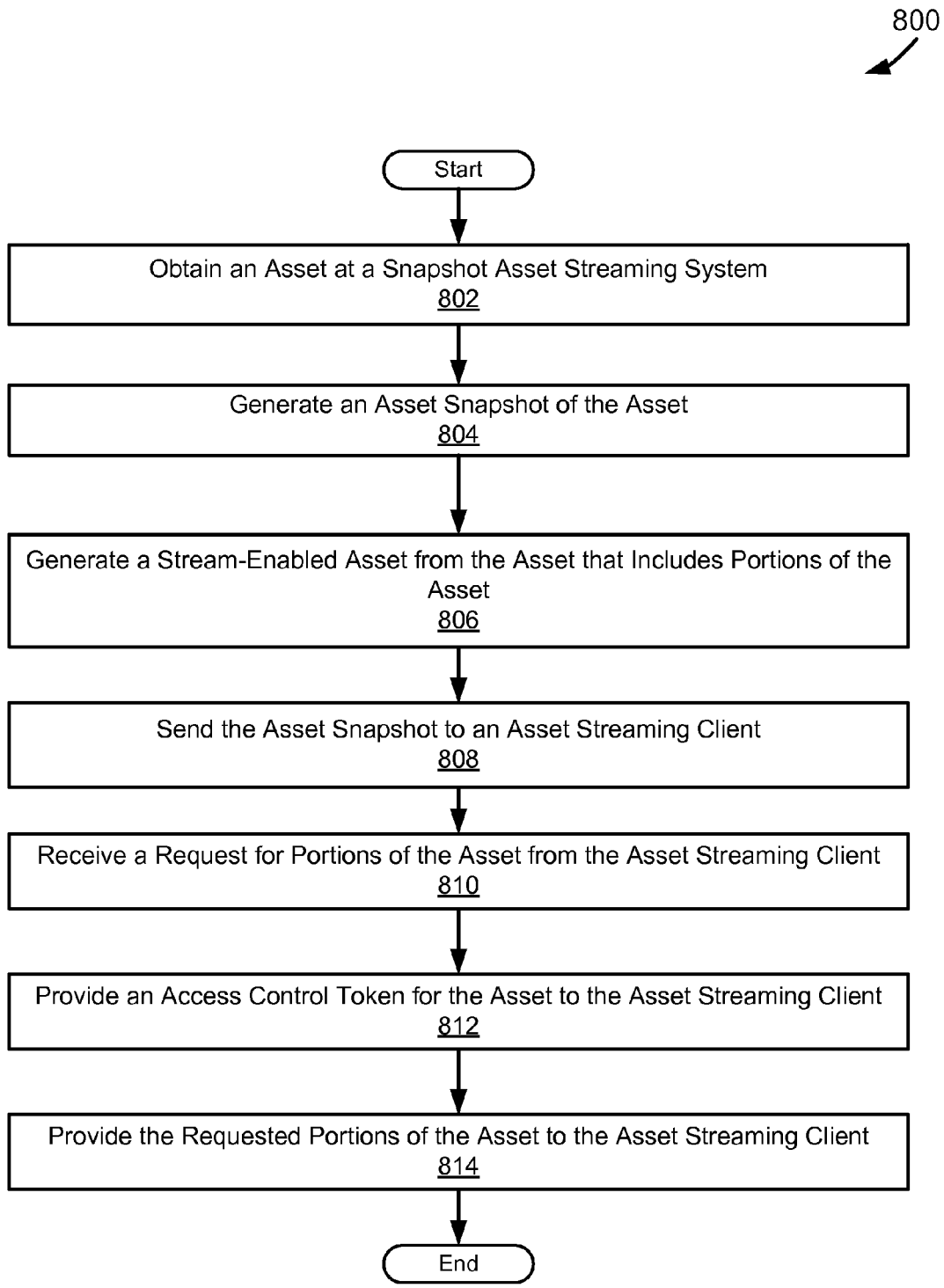
FIG. 8 depicts a flowchart of an example of a method for providing an asset snapshot and portions of an asset to an asset streaming client.

FIG. 8 depicts a flowchart 800 of an example of a method for providing an asset snapshot and portions of an asset to an asset streaming client. The flowchart 800 begins at module 802 where an asset is obtained at a snapshot asset streaming system. An asset can be obtained at a snapshot asset streaming system after the snapshot asset streaming system receives a request to begin exploiting the asset from an asset streaming client.

The flowchart 800 continues to module 804, where an asset snapshot of the asset is generated. Depending upon implementation-specific or other considerations, an asset snapshot of the asset can be generated by exploiting the asset. For example, the asset can be run on a test bed machine to determine the characteristics of the asset, and what portions of the asset are needed in order to exploit the asset according to specific characteristics of the asset.

The flowchart 800 continues to module 806, where a stream-enabled asset is generated for the asset. The stream-enabled asset includes portions of the asset into which the asset is broken. Depending upon-implementation specific or other considerations, the stream-enabled asset can be created as a result of running the asset on a test bed machine. For example, the asset can be broken into portions based on what characteristics of the asset specific portions of the asset are used to exploit. In another example, the asset can be broken into portions based on characteristics of a network over which portions of the asset will be streamed to an asset streaming client.

The flowchart 800 continues to module 808, where an asset snapshot for an asset is send to an asset streaming client. Depending upon implementation-specific or other considerations, an asset snapshot can be sent to an asset streaming client in response to a request for an asset snapshot received from the asset streaming client. Further depending upon implementation-specific or other considerations, an asset snapshot can be sent to an asset streaming client automatically after the asset snapshot is generated.

The flowchart 800 continues to module 810, where a request for portions of the asset is received at the snapshot asset streaming system from the asset streaming client. The request for portions of the asset can be generated based on an asset snapshot sent to the asset streaming client at module 808.

The flowchart 800 continues to module 812, where an access control token for the asset is provided to the asset streaming client. The flowchart then continues to module 814, where the requested portions of the asset are provided to the asset streaming client. The requested portions of the asset can be used to exploit the asset in accordance with a request intercepted at the asset streaming client either from an asset that is an application or an operating system running on the asset streaming client.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   intercepting, at an asset streaming client, a request to execute an asset virtualized on the asset streaming client, wherein the asset is an application executed in an application layer on the asset streaming client;
   identifying the asset;
   obtaining, at the asset streaming client, an asset snapshot of the asset;
   determining characteristics of the asset from the request to execute the asset;
   determining, at the asset streaming client, portions of the asset needed to execute the asset according to the request to execute the asset and the characteristics of the asset determined from the request to execute the asset, the portions of the asset determined from the asset snapshot of the asset;
   obtaining the portions of the asset needed to execute the asset according to the request to execute the asset and the characteristics of the asset determined from the request to execute the asset, the portions of the asset obtained from a remote snapshot asset streaming system;

executing the asset using the portions of the asset needed to execute the asset according to the request to execute the asset and the characteristics of the asset determined from the request to execute the asset.

2. The method of claim 1, further comprising:

determining whether the portions of the asset reside locally on the asset streaming client;

if it is determined that the portions of the asset reside locally on the asset streaming client, retrieving the portions of the asset from local storage on the asset streaming client.

3. The method of claim 1, further comprising:

determining whether the portions of the asset reside locally on the asset streaming client;

if it is determined that the portions of the asset reside locally on the asset streaming client:

generating a request for the portions of the asset;

sending the request for the portions of the asset to the remote snapshot asset streaming system;

receiving at the asset streaming client the portions of the asset from the remote snapshot asset streaming system.

4. The method of claim 1, wherein the asset snapshot is generated by executing the asset on a test bed machine.

5. The method of claim 1, wherein the portions of the asset are part of a stream-enabled asset generated by executing the asset on a test bed machine.

6. The method of claim 1, wherein the portions of the asset are jumpstart portions of the asset.

7. The method of claim 1, further comprising:

receiving an access control token for the asset;

executing the asset using the portions of the asset after receiving the access control token for the asset.

8. A system comprising:

an asset snapshot management engine configured to obtain an asset snapshot of an asset at an asset streaming client, wherein the asset is an application executed in an application layer on the asset streaming client;

an asset streaming abstraction engine configured to:

receive a request, intercepted at the asset streaming client, to execute the asset virtualized on the asset streaming client;

determine characteristics of the asset to execute from the request to execute the asset;

determine, at the asset streaming client, portions of the asset needed to execute the asset according to the request to execute the asset and the characteristics of the asset determined from the request to execute the asset, the portions of the asset determined from the asset snapshot of the asset;

obtain the portions of the asset needed to execute the asset according to the request to execute the asset and the characteristics of the asset determined from the request to execute the asset, the portions of the asset obtained from a remote snapshot asset streaming system;

execute the asset using the portions of the asset needed to execute the asset according to the request to execute the asset and the characteristics of the asset determined from the request to execute the asset.

9. The system of claim 8, further comprising:

an asset streaming client memory management engine configured to:

determine whether the portions of the asset reside locally on the asset streaming client;

if it is determined that the portions of the asset reside locally on the asset streaming client, the asset streaming client memory management engine further configured to:

retrieve the portions of the asset from local storage on the asset streaming client;

provide the retrieved portions of the asset to the asset streaming abstraction engine.

10. The system of claim 8, further comprising:

an asset streaming client memory management engine configured to determine whether the portions of the asset reside locally on the asset streaming client;

an asset download engine configured to, if it is determined that the portions of the asset do not reside locally on the asset streaming client:

generate a request for the portions of the asset;

send the request for the portions of the asset to the remote snapshot asset streaming system;

receive the portions of the asset from the remote snapshot asset streaming system;

provide the received portions of the asset to the asset streaming abstraction engine.

11. The system of claim 8, wherein the asset snapshot is generated by executing the asset on a test bed machine.

12. The system of claim 8, wherein the portions of the asset are part of a stream-enabled asset generated by executing the asset on a test bed machine.

13. The system of claim 8, wherein the portions of the asset are jumpstart portions of the asset.

* * * * *